Figure 1:
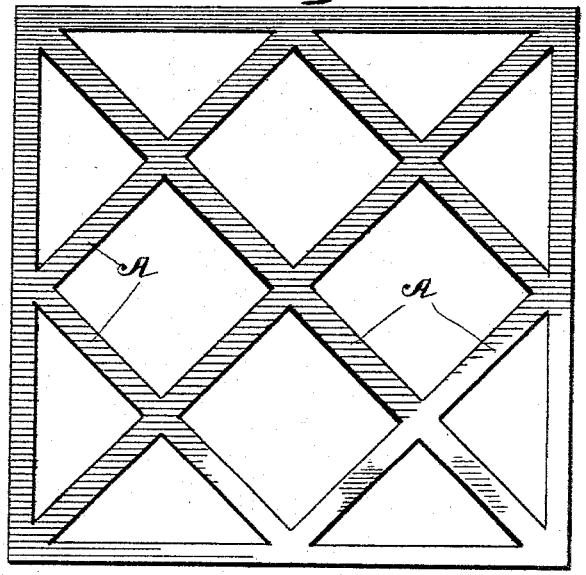

(Specimens.)

2 Sheets—Sheet 1.

S. EVANS.
PROCESS OF CHIPPING GLASS.

No. 494,999.

Patented Apr. 4, 1893.

Witnesses:
Lute S. Alter
Jessa G. Parrish

Inventor:
Samuel Evans
By Charles T. Brown
Atty.

(Specimens.)
2 Sheets—Sheet 2.
S. EVANS.
PROCESS OF CHIPPING GLASS.
No. 494,999. Patented Apr. 4, 1893.
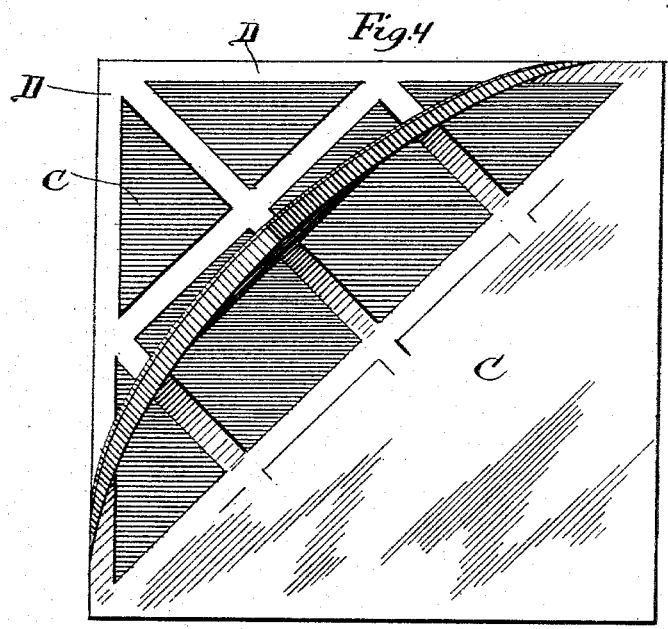
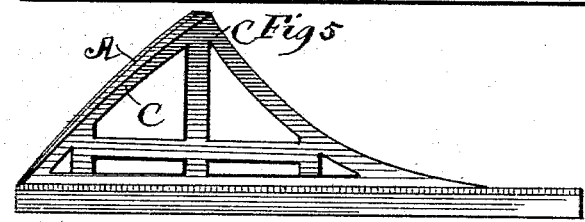
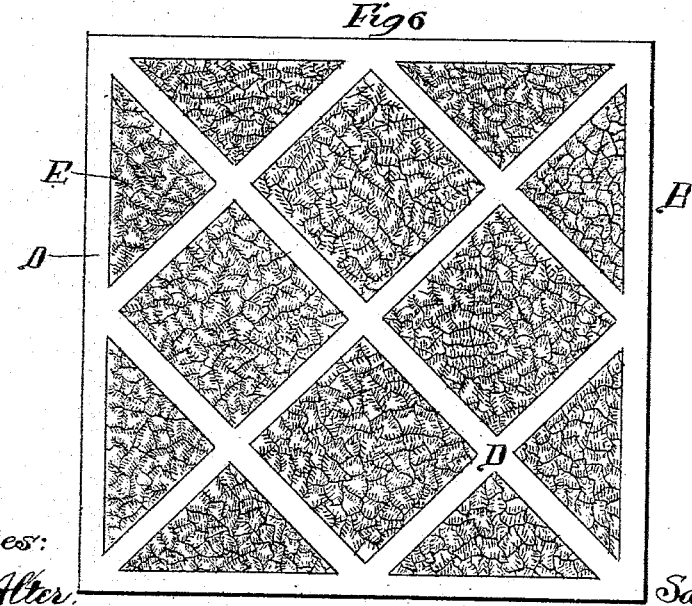
Witnesses:
Lute S. Alter.
Tusa G. Parrish.
Inventor:
Samuel Evans
By Charles T. Brown
Atty

UNITED STATES PATENT OFFICE.

SAMUEL EVANS, OF CHICAGO, ILLINOIS, ASSIGNOR OF ONE-HALF TO CHARLES L. RAWSON, OF SAME PLACE.

PROCESS OF CHIPPING GLASS.

SPECIFICATION forming part of Letters Patent No. 494,999, dated April 4, 1893.

Application filed April 16, 1891. Serial No. 389,257. (Specimens.)

*To all whom it may concern:*

Be it known that I, SAMUEL EVANS, of the city of Chicago, in the county of Cook and State of Illinois, have invented certain new and useful Improvements in Processes of Chipping Glass, of which the following is a specification.

This invention relates to a process of chipping glass wherein a sheet of glass is prepared for and ground by the sand blast process and a chipping compound is afterward applied to such glass in a manner to produce when the sheet of glass ornamented by this process was, before being treated by the process on the part thereof chipped thereby, clear glass, ornamentation thereon consisting of combined portions of clear and chipped surfaces forming a determined design, and to produce when such sheet of glass was before being treated by this process a combination of clear and ground glass, ornamentation consisting of combined portions of ground and chipped surfaces forming a determined design.

In my process of preparing glass for the sand blast process, the pattern employed is the negative of the design to be produced upon the surface of such glass and not the positive thereof, and after such pattern has been placed upon the sheet of glass to be ornamented by this process and attached thereto, such pattern is allowed to so remain thereon, till after the grinding of the sheet of glass and the application of the liquid chipping compound thereto has been effected when such pattern, with the chipping compound thereover is removed. By thus placing the pattern on the glass and allowing it to remain there during the grinding and during the placing of the chipping compound completely over the glass and the pattern thereon, and then removing the pattern, (and by such removal of the pattern removing the chipping compound from the portion of the glass, ground or unground, to be unchipped,) the boundary line of the ground to be chipped and the boundary line of the chipping compound remaining on the glass are necessarily coincident, while in all processes heretofore known the boundary line of the ground glass to be chipped (where the part chipped is to be surrounded by clear glass) and the boundary line of the chipping compound remaining on the glass during the process of chipping are not and cannot be made to be coincident, but only approximately so.

I have illustrated my invention by the drawings accompanying and forming a part hereof, in which—

Figure 2:
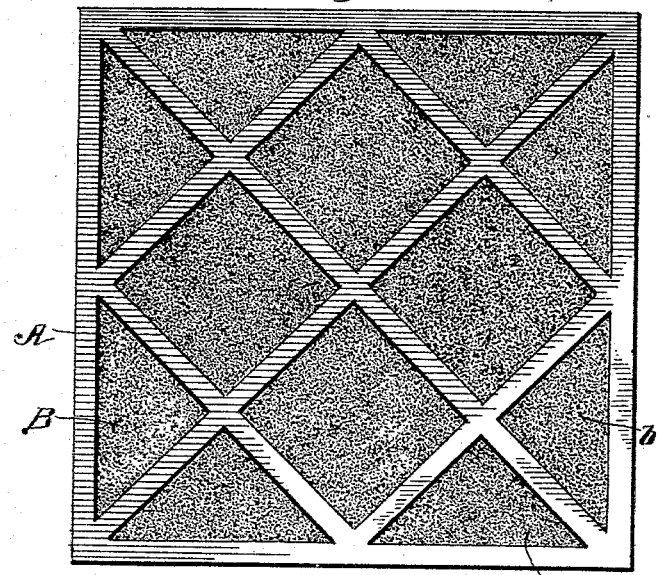
Figure 3:

Figure 1 is a plan view of a pattern. Fig. 2 is a plan view of a plate of glass having the pattern secured thereon after such glass and pattern have been subjected to the sand blast process. Fig. 3 is an elevation of the glass and pattern illustrated in Fig. 2. Fig. 4 is an elevation of the glass and pattern thereon illustrated in Figs. 2 and 3, and with the chipping compound spread over the glass and pattern, such pattern being partially raised from the glass with the chipping compound thereover in a liquid condition. Fig. 5 is an end elevation of Fig. 4; and Fig. 6 is a view of a chipped piece of glass ornamented by my process, and by the use in such process of the pattern illustrated in Fig. 1.

Like letters refer to similar parts throughout the several views.

A is a pattern.

B is a sheet of glass and $b$ is a portion thereof which has been ground by the sand blast process with the pattern A thereon.

C is a chipping compound.

D is a portion of the sheet of glass B which remains in the same condition after the glass has been subjected to this process in which it was before the glass was subjected thereto.

E is a portion of the sheet of glass B which has been chipped by this process.

In the practicing of this invention the pattern A is the negative of the design to be produced, and is necessarily constructed of flexible material readily removable from the sheet of glass being ornamented while the glass chipping compound is in a liquid or semi-liquid condition thereover, without disturbing such glass chipping compound upon the portion of the glass which is to be chipped thereby, and such pattern must also be constructed of material adapted to resist the action of the sand blast process when subjected thereto upon a sheet of glass, being ornamented by this process. The material which I prefer to use for such pattern and which I deem best adapted to meet all the requirements demanded thereof is paper, and the particular kind of paper which I have heretofore employed is termed in the trade heavy document manila paper. In employing a pattern constructed of this material the paper must be well oiled and allowed to dry before being used. The pattern may be obtained from such paper by attaching a sheet thereof, after the same has been well oiled and allowed to thoroughly dry, to the sheet of glass to be ornamented by this process and then cutting the desired designs therefrom and removing the portions so cut from or out of the paper from the surface of the sheet of glass to which it is attached, thereby leaving a pattern which is a negative of the design to be produced, by chipping, on the glass; or the designs can be cut out of or from the oiled paper before attaching such oiled paper to the sheet of glass. Such patterns may be obtained at small cost by superimposing a number of sheets of oiled paper upon each other, and cutting out the desired designs therefrom:—from eight to twenty-five of such oiled paper patterns being readily cut in this manner. To ornament a sheet of glass by this process the surface thereof on which the ornamentation is to be applied is cleaned and covered completely over with a thin film of soap, or other equivalent material. A coating of asphaltum, obtained by applying asphaltum cut or digested in spirits of turpentine in the ordinary way to form a paint compound readily applied by a brush, constitutes at times a desirable substitute for the film of soap last above named. Either of the above coatings can be applied to the glass and the pattern A lead thereon, and attached thereby to the surface of the glass. The choice, if any choice there be, of the one of such coatings to be employed is determined by the character of the design to be chipped upon the sheet of glass. That is to say, if the ornamentation consists of a large number of surfaces of single chipped glass on a sheet of clear glass, or if such surfaces are of small area, I prefer to use the coating of asphaltum instead of the film of soap, for the reason that such coating of asphaltum will be removed from the portions of the glass not covered by the pattern by the action of the sand blast in the sand blast process at the same time such portions of glass are being ground, and after such grinding, the pattern is nearly, if not quite, as readily removed in the manner and at the time hereinafter described, as where the film of soap is employed, while the film of soap must be removed from the surface of the glass on the parts thereof to be ground by the sand blast in the action of the sand blast process before the sheet of glass is subjected thereto, such film of soap constituting what is termed in the art, a resistant to the sand blast process, and as the removal of the soap necessitates the application thereto of a wet or dampened sponge or cloth or other article, there is, in the cases named, (and in every case where the pattern is laid on a sheet of ground glass,) a liability to loosen or start the pattern A from the sheet of glass sufficiently to injure the definiteness of the contour line of the portion of the glass which is ground when subjected to the sand blast process.

Where double chipping is to be obtained on the surface of a sheet of clear glass, I prefer, to first apply a coating of liquid asphaltum to the glass, allow it to dry, and then apply a thin film of soap so as to entirely cover such coating of asphaltum, and then apply pattern A to the glass.

Where a film of soap is used, either with or without the coating of asphaltum, such film is adjacent to the pattern A, and the portions of such film exposed to view through the apertures of such pattern or around the designs therein are removed by applying thereto a wet sponge or cloth in the same manner as when the film of soap alone is used, before the sheet of glass protected by the pattern is subjected to the sand blast process.

The sheet of glass with the pattern thereon is then subjected to the sand blast process.

After the glass has been sufficiently ground, an ordinary glass chipping compound is applied, in a heated condition, to the entire surface of the glass, covering both the glass and the paper pattern still thereon. I prefer to apply this glass chipping compound with a brush in the ordinary way. After the surface of the glass has been well covered with the chipping compound, the paper pattern is raised from off the glass, using when desired a suitable instrument, as for instance a knife blade, such instrument being inserted between the paper pattern and the glass, whenever necessary. The manner in which the pattern is thus raised off the glass is illustrated in Figs. 4 and 5 of the drawings. Such raising of the pattern must be effected while the chipping compound thereover is in a semi-liquid condition and in such manner as to carry therewith the glass chipping compound thereover, and to leave upon the glass the glass chipping compound covering such parts and such parts only of the glass as were unprotected by the pattern from the action of the sand blast process. The glass chipping compound remaining on the glass will commence to dry first at its edges, and so the chipping starts along the line of the edges, thereby giving well defined contour lines to the chipped surface.

In practice I have found that where the pattern is constructed of paper of the kind named, and well oiled, and the material employed for sticking it to the glass is a coating consisting of a film of soap either with or without the coating of asphaltum thereunder, such pattern will adhere in place during the grinding or marking thereof by the sand blast process so as to obtain definite contour lines to the ground portions thereof, while at the same time it can be readily and rapidly removed from the glass after the chipping compound has been applied thereto, while such chipping compound is in, a liquid condition thereby carrying therewith the glass chipping compound thereover. The glass with the chipping compound is placed, after the patterns and the chipping compound immediately thereover have been removed, as described, in racks and allowed to remain until the glass is chipped, in the ordinary way. A second coating of glass chipping compound can be applied to the entire surface of the glass as soon as the glass has received its first chipping, when both a coating of asphaltum, and a coating of soap has been applied to the glass as described: a sufficiently heavy coating of asphaltum remaining on the unchipped portion of the glass to protect it from the action of such second coating.

Having thus described my invention, what I claim, and desire to secure by Letters Patent, is—

1. The process of chipping glass which consists in covering the surface of the glass with a thin film of soap, in applying a pattern thereover adapted to resist the action of a sand blast process, of removing the film of soap exposed in the openings of the pattern, in subjecting the glass with the pattern thereon to the sand blast process, in applying a glass chipping compound in a liquid condition to the surface of the glass and the pattern thereon, in lifting the pattern off the glass together with the chipping compound thereover while such chipping compound is in a liquid condition and in allowing the chipping compound to dry in the ordinary way; substantially as described.

2. The process of chipping glass which consists in covering the surface of the glass with a coating adhering to the glass sufficiently well to form a means of attaching a flexible pattern thereover, and adapted to form a coating protecting the glass from the action of a glass chipping compound when interposed between the glass and such glass chipping compound, in applying a flexible pattern thereover adapted to resist the action of the sand blast process, in subjecting the glass with the pattern thereon to the action of the sand blast process, in coating the entire surface of the glass with a glass chipping compound in a liquid condition, in removing the flexible pattern from the glass together with the glass chipping compound thereover while the glass chipping compound is in a liquid condition, and in allowing the glass chipping compound to dry in the ordinary way; substantially as described.

3. The process of chipping glass which consists in covering the surface of the glass with a coating adhering to the glass sufficiently well to form a means of attaching a flexible pattern thereto and adapted to form a coating protecting the glass from the action of a glass chipping compound when interposed between the glass and such glass chipping compound, in applying a coating consisting of a thin film of soap upon the first named coating, in applying a flexible pattern thereover adapted to resist the action of the sand blast process, in removing the coating of soap from the glass where the same is exposed through the pattern, in subjecting the glass with the pattern thereover to the sand blast process, in coating the entire surface of the glass with a glass chipping compound in a liquid condition, in removing the flexible pattern from the glass together with the glass chipping compound thereover while the glass chipping compound is in a liquid condition, in allowing the glass chipping compound to dry in the ordinary way, and in applying a second coat of glass chipping compound over the entire surface of the glass and allowing the same to dry in the ordinary way; substantially as described.

SAMUEL EVANS.

Witnesses:
THOMAS A. HEWITT,
CHARLES T. BROWN.